United States Patent Office 3,080,324
Patented Mar. 5, 1963

3,080,324
GRIGNARD REAGENTS
Donald L. Richards and Kenneth R. Molt, Cincinnati, Ohio, assignors to The Cincinnati Milling Machine Co., Cincinnati, Ohio, a corporation of Ohio
No Drawing. Filed Aug. 1, 1960, Ser. No. 46,350
18 Claims. (Cl. 252—182)

This invention relates to Grignard reagents, more particularly Grignard reagents dispersed in hydrocarbon media which are solids at room temperature, and a process for the preparation thereof.

It is well known that Grignard reagents which are made from magnesium and organic halides, as, for example, from magnesium and butyl chloride, or from magnesium and phenyl chloride, are very unstable when exposed to air and light and lose all, or a large part, of their activity upon such exposure in a relatively short period of time. One of the limitations heretofore encountered, therefore, in the use of such reagents has been the necessity to use them promptly after their preparation. The handling, shipping and storage of Grignard reagents has always been a troublesome problem.

One of the objects of the present invention is to prepare new and useful compositions containing Grignard reagents which can be handled, shipped and stored more readily than has heretofore been possible.

Another object of the invention is to prepare compositions of the type described which can be used as such for carrying out various types of reactions in which Grignard reagents have heretofore been employed.

Another object of the invention is to provide a new and improved process for preparing Grignard reagents.

A still further object of the invention is to provide a process and means for preparing, handling, shipping, storing and utilizing Grignard reagents which is relatively safe, even in large scale manufacture. Other objects will appear hereinafter.

In accordance with the invention it has been found that new and useful compositions containing Grignard reagents are obtained by providing solid Grignard reagent dispersions in hydrocarbon media which are normally solid at room temperature (e.g., 20–25° C.) and atmospheric pressure. This is accomplished in several ways. For example, the Grignard reagent can be prepared in a conventional manner by reacting magnesium with an organic halide, such as an organic chloride, or an organic bromide, or an organic iodide, in a solvent, such as diethylether, tetrahydrofuran, and then dispersing the Grignard reagent in hydrocarbon media which are solid at room temperature, the solvent being removed before, during or after such dispersion to provide a product consisting essentially of the Grignard reagent dispersed in hydrocarbon media which are solid at room temperature.

An alternative procedure is to prepare the Grignard reagent in the form of a disperson in hydrocarbon media which are liquid at room temperature, such, as, for example, heptane, pentane, triisobutylene, cyclohexane, Stoddard solvent, mineral spirits, toluene, xylene, decane, tetralin, decalin, mixtures of pentane and hexane, and mixtures of two or more of any other such hydrocarbons, and add a hydrocarbon medium which is solid at room temperature but which is heated sufficiently to maintain it in the molten state. In this case the liquid hydrocarbon is removed either before, during or after the addition of the normally solid hydrocarbon and the final product, on cooling, is a solid containing the Grignard reagent dispersed in a hydrocarbon medium which is solid at room temperature.

A third and preferred way of preparing the compositions of the invention is to prepare the Grignard reagent directly in the hydrocarbon medium which is solid at room temperature. This is accomplished by mixing the magnesium and the organic halide with the hydrocarbon medium which is solid at room temperature under the influence of heat sufficient to convert such hydrocarbon medium to a liquid state, and cooling the reaction mixture to the solid state after the Grignard reagent has formed.

The products prepared in accordance with the invention are less subject to deterioration in handling, shipping and storage and require fewer precautions than dry powdered Grignard reagents or solutions of Grignard reagents in oxygenated solvents, such as diethylether. Thus, a dry powdered Grignard reagent such as is prepared from the reaction of butyl chloride and magnesium is very reactive in air and is difficult to handle. The same Grignard reagent dissolved in solvents, such as diethylether, is also difficult to handle and requires the use of exceptional precautions. On the other hand, this same Grignard reagent chloride coated with a hydrocarbon which is solid at room temperature, such as, for example, paraffin wax, tetramethylbenzene, naphthalene, eicosane, or other hydrocarbons which are normally solid at room temperature, is relatively easy to handle, ship and store. While some precautions still must be taken in handling, shipping and storing Grignard reagents dispersed in solid hydrocarbon media, they are relatively easy to handle, ship and store with ordinary precautions and do not require the exceptional precautions normally employed heretofore with Grignard reagents dissolved in solvents such as diethylether or tetrahydrofuran. The compositions containing Grignard reagents and hydrocarbon media which are solid at room temperature retain a major part of their activity during handling, shipping and storage. They can also be stored under nitrogen and, in many cases, this is desirable but it is not always necessary. Storage in the absence of light is also desirable but not always necessary. In many cases the compositions of the invention are satisfactory for use when stored in air or light.

The compositions of the invention have the further advantage that they can be used directly in carrying out many different reactions where Grignard reagents are ordinarily employed without first separating the hydrocarbon which is solid at room temperature. It is not necessary to dissolve the Grignard reagent in diethylether or other oxygenated solvents to make it reactive.

The following examples are given to illustrate the practice of the invention. In these examples the reactions were conducted in a three-necked one liter flask, equipped with a stirrer, reflux condenser, dropping funnel, thermometer, nitrogen inlet tube and an electric heating mantle. An atmosphere of pure dried nitrogen was maintained over the reaction mixture at all times. The percentage conversion of organic halide to Grignard reagent (as RMgCl) was determined by acidmetry. Two or three grams of the reaction mixture (rapidly stirred to make it more homogeneous) was pipetted from the reactor into a tared 100 ml. volumetric flask and weighed accurately. The sample was diluted to volume with dried diethylether (dried with sodium) and after thirty minutes of settling, 25 ml. of the clear, supernatant liquid was pipetted into 50 ml. of 0.1 N aqueous hydrochloric acid. Standard potassium hydroxide (0.1 N) was used to titrate to a phenolphthalein end point. The percentage of Grignard reagent was calculated by the following equation:

$$\text{Percent RMgCl} = \frac{[(\text{ml. HCl} \times \text{N HCl}) - (\text{ml. KOH} \times \text{N KOH})] \frac{\text{Mol. wt. of RMgCl}}{1000}}{\text{Wt. of sample in aliquot}} \times 100$$

The Grignard reagents dispersed in a hydrocarbon medium which is solid at room temperature were sampled by taking a number of cross sectional slices and dissolving them to a known volume in warm diethylether.

EXAMPLE I

*Butylmagnesium Chloride Made in Paraffin*

Formula:
- 0.5 mole—12.15 g. magnesium chips
- 0.5 mole—46.3 g. butyl chloride (1-chlorobutane)
- 200.0 g. paraffin, melting point 128–130° F.

*Procedure.*—The equipment was flushed with dry nitrogen, then charged with the magnesium and paraffin. After heating to 300° F. with agitation about one-tenth of the 1-chlorobutane was added. The reaction began within 5 minutes and the rest of the 1-chlorobutane was added over the course of 25 minutes at 300°–310° F. After reacting for 30 additional minutes at 300–305° F. the mixture was cooled to 150° F. and filtered to remove the excess wax. The cold solid filtercake was broken into chunks and stored in a closed jar.

Yield=37.7 g. butylmagnesium chloride
=64.4% of theoretical yield

EXAMPLE II

*Butylmagnesium Chloride Made in Paraffin*

Reagents:
- 0.5 mole—12.15 g. magnesium chips
- 0.6 mole—55.6 g. butyl chloride (1-chlorobutane)
- 150.0 g. paraffin, melting point 128–130° F.

The procedure was the same as that used in Example I.

Yield=43.1 g. butylmagnesium chloride
=73.6% of theoretical yield

EXAMPLE III

*Butylmagnesium Chloride Made in Paraffin*

Reagents:
- 0.5 mole—12.15 g. magnesium chips
- 0.5 mole—46.3 g. butyl chloride (1-chlorobutane)
- 100.0 g. paraffin, melting point 128–130° F.

This batch was made in the same manner as in Example I but using a reaction temperature of 260–270° F. The sample for analysis was a number (5 g.) of cross sectional slices of the solid cake.

Yield=36.5 g. butylmagnesium chloride
=62.4% of theoretical yield

EXAMPLE IV

*Butylmagnesium Chloride Made in Paraffin*

Reagents:
- 0.5 mole—12.15 g. magnesium chips
- 0.5 mole—46.3 g. butyl chloride (1-chlorobutane)
- 150.0 g. paraffin, melting point 128–130° F.

This batch was made in the same manner as in Example I, but using a reaction temperature of 230–240° F.

Yield=36.4 butylmagnesium chloride
=62.3% of theoretical yield

EXAMPLE V

*Phenylmagnesium Chloride Made in Heptane and Paraffin*

Reagents:
- 0.5 mole—12.15 g. magnesium chips
- 0.5 mole—56.2 g. phenyl chloride (chlorobenzene)
- 50.0 g. heptane
- 270.0 g. paraffin, melting point 128–130° F.

*Procedure.*—The equipment was flushed with dry nitrogen and charged with the magnesium, heptane and paraffin. The mixture was heated to reflux (298° F.) and agitated vigorously; about one-tenth of the chlorobenzene was added; reaction occurred within 5 minutes. The remaining chlorobenzene was added in 25 minutes at reflux. The batch was refluxed for 4 hours, then the heptane was stripped off under vacuum (30 mm. mercury) at 230–250° F. After cooling to 150° F. the batch was filtered on a heated Buchner funnel to remove the excess wax. The cooled filter cake was broken into chunks and stored in a closed jar containing air.

Yield=48.5 g. phenylmagnesium chloride
=70.8% of theoretical yield

EXAMPLE VI

*Butylmagnesium Chloride Made in Heptane and Paraffin*

Reagents:
- 0.5 mole—12.15 g. magnesium chips
- 0.5 mole—46.3 g. butyl chloride (1-chlorobutane)
- 50.0 g. heptane
- 270.0 g. paraffin wax, melting point 128–130° F.

This batch was made in the same manner as in Example V except that a shorter reaction period (40 minutes at reflux) was used (298° F.).

Yield=34.5 g. butylmagnesium chloride
=58.8% of theoretical yield

EXAMPLE VII

*Butylmagnesium Chloride Made in Paraffin*

This batch was made in paraffin wax in the same manner as described in Example I. It contained 25.0% butylmagnesium chloride and after 15 days storage in an opaque jar under an atmosphere of dry nitrogen, the butylmagnesium chloride content was substantially the same. After 2½ months of storage under these conditions the butylmagnesium chloride content was 24.5%.

EXAMPLE VIII

*Butylmagnesium Chloride Made in Naphthalene*

Reagents:
- 0.5 mole—12.15 g. magnesium chips
- 0.5 mole—46.30 g. butyl chloride (1-chlorobutane)
- 150.0 g. naphthalene

*Procedure.*—The apparatus was flushed with dry nitrogen and then charged with the magnesium and naphthalene. After heating to 240° F., the butyl chloride was added in 15 minutes and the reaction continued at 230–240° F. for one hour. The batch was cooled to 190° F. and sampled for analysis. 54.8% of the theoretical yield of butylmagnesium chloride was obtained.

EXAMPLE IX

*Butylmagnesium Chloride Made in Durene (Tetramethylbenzene)*

The reagents and procedure were the same as for Example VIII except that durene was used in place of naphthalene. 46.1% of the theoretical yield of butylmagnesium chloride was obtained.

EXAMPLE X

*Butylmagnesium Chloride Made in High Melting Point Paraffin*

Reagents:
- 1.0 mole—24.3 g. magnesium chips
- 1.0 mole—92.6 g. butyl chloride (1-chlorobutane)
- 200.0 g. paraffin wax, melting point 145–150° F.

The procedure was the same as in Example VIII. 59.3% of the theoretical yield of butylmagnesium chloride was obtained.

EXAMPLE XI

Phenylmagnesium Chloride Made in Paraffin

Reagents:
- 0.5 mole—12.15 g. magnesium chips
- 0.5 mole—56.2 g. phenyl chloride (chlorobenzene)
- 150.0 g. paraffin melting point 128–130° F.

*Procedure.*—The apparatus was flushed with dry nitrogen and then charged with the magnesium and paraffin. The mixture was stirred and heated to 320° F. and about one-tenth of the chlorobenzene was added. The reaction started within 5 minutes and the rest of the chlorobenzene was added in one-half hour. The reaction was continued for 1.75 hours at 320–330° F. After cooling to 150° F., the excess wax was removed by filtration. The filter cake was cooled until solid and broken into chunks and stored in a closed jar under nitrogen.

Yield = 53.5 g. phenylmagnesium chloride
= 78.4% of theoretical yield

EXAMPLE XII

Phenylmagnesium Chloride Made in Paraffin

Reagents: Same as that used in Example XI.

*Procedure.*—The paraffin and magnesium were heated to 290° F. in an atmosphere of nitrogen and the chlorobenzene was added over a one-half hour period. The mixture was stirred at 280°–290° F. for 40 minutes without evidence of reaction. The temperature was increased to 320° F. at which point an exothermic reaction began. The temperature rose to 350° F. even through a cold water bath was used to cool the flask. After a few minutes the temperature was reduced to 300° F. and maintained there for a 2-hour reaction period. The batch was cooled to 150° F. and the excess wax removed by filtration.

Yield = 53.6 g. phenylmagnesium chloride
= 78.6% of theoretical yield

EXAMPLE XIII

Phenylmagnesium Chloride Made in Paraffin

Reagents:
- 0.5 mole—12.15 g. of magnesium chips
- 0.6 mole—67.6 g. phenyl chloride (chlorobenzene)
- 150.0 g. paraffin, melting point 128–130° F.

*Procedure.*—Same as that used in Example XI. 88.4% of the theoretical yield of phenylmagnesium chloride was obtained.

EXAMPLE XIV

Phenylmagnesium Chloride in Paraffin

This batch was made in the same manner as Example XI. The filter cake contained 45.0% of phenylmagnesium chloride and after 15 days storage in an opaque jar under an atmosphere of dry nitrogen the phenylmagnesium chloride content was 44.9%. After 2½ months of storage under these conditions, the phenylmagnesium chloride content was 44.6%.

EXAMPLE XV

Phenylmagnesium Chloride Made in High Melting Point Paraffin

Reagents:
- 1.0 mole—24.3 g. magnesium chips
- 1.0 mole—112.5 g. phenyl chloride (chlorobenzene)
- 200.0 g. paraffin wax, melting point 145–150° F.

The procedure was the same as in Example VIII but using 320–340° F. for the reaction temperature. 70.9% of the theoretical yield of phenylmagnesium chloride was obtained.

EXAMPLE XVI

Phenylmagnesium Chloride Made in Naphthalene

Reagents:
- 0.5 mole—12.15 g. magnesium chips
- 0.5 mole—56.3 g. phenyl chloride (chlorobenzene)
- 150.0 g. naphthalene The procedure was the same as in Example VIII but using 330–340° F. as the reaction temperature. 72.4% of the theoretical yield of phenylmagnesium chloride was obtained.

EXAMPLE XVII

Phenylmagnesium Chloride Made in Durene (Tetramethylbenzene)

The reagents and procedure were the same as in Example XVI except that durene was used in place of naphthalene. 78.9% of theoretical yield of phenylmagnesium chloride was obtained.

The following examples illustrate the utility of the compositions of the invention.

EXAMPLE XVIII

Triphenylcarbinol

Reagents:
- 0.314 mole—107 g. phenylmagnesium chloride of Example XIII
- 350 ml. Stoddard solvent
- 0.5 mole—91.0 g. benzophenone
- 150.0 ml. benzene

*Procedure.*—The wax coated phenylmagnesium chloride was dissolved in the Stoddard solvent at 150° F. and the benzophenone, dissolved in the benzene, was slowly added. The solution was refluxed at 230° F. for ½ hour and then cooled to 150° F. Water (200 g.) containing 50 g. of concentrated sulfuric acid was slowly added to the solution and the mixture was stirred for a few minutes at 150–160° F. The aqueous acid layer was removed and the hydrocarbon layer was neutralized with aqueous sodium bicarbonate. The warm hydrocarbon layer was cooled to 70° F. and triphenylcarbinol which precipitated was removed by filtration and purified by recrystallization from carbon tetrachloride. Yield = 64 g.

The filtrate was stripped of benzene and cooled to 65° F. and filtered. The crude triphenylcarbinol from this filtration was recrystallized from carbon tetrachloride.

Total yield = 72.0 g. of triphenylcarbinol
= 88.2% of theoretical based on phenylmagnesium chloride

EXAMPLE XIX

Triphenylcarbinol

Reagents:
- 0.391 mole—118 g. phenylmagnesium chloride of Example XIII
- 300 ml. diethylether
- 0.5 mole—91 g. benzophenone
- 200 ml. benzene

*Procedure.*—The apparatus was flushed with dry nitrogen and charged with the ether and wax coated phenylmagnesium chloride. The wax and phenylmagnesium chloride were dissolved by refluxing the ether for a few minutes. After cooling, the benzophenone dissolved in the benzene, was slowly added and the mixture was refluxed for one hour. It was then poured onto 700 g. of crushed ice containing 50 g. of concentrated sulfuric acid. The mixture was stirred and warmed to 80° F. to complete the hydrolysis. The water layer was removed and the ether-benzene layer was washed with (1) 200 ml. of warm water; (2) 200 ml. of 5% sodium bicarbonate solution, and (3) 200 ml. of warm water.

After evaporating the ether and most of the benzene on a steam bath, 400 ml. of carbon tetrachloride were added and the mixture was warmed to dissolve the triphenylcarbinol. The solution was cooled to 60° F. and the crystalline triphenylcarbinol removed by filtration. After air drying for 48 hours the crystals were free of carbon tetrachloride odor.

Yield = 82.1 g. triphenylcarbinol
= 80.5% of theoretical yield based on the phenylmagnesium chloride

EXAMPLE XX

*Dibutylpropylcarbinol*

Reagents:
0.235 mole—88.0 g. butylmagnesium chloride of Example VI
0.248 mole—74.0 g. butylmagnesium chloride of Example III
———
0.483
400 ml. dry diethylether
0.3 mole—34.8 g. ethylbutyrate
60.0 ml. diethylether

*Procedure.*—The wax coated butylmagnesium chloride was dissolved in 400 ml. of diethylether and the ethylbutyrate (dissolved in 60 ml. diethylether) was slowly added. The solution was refluxed for one hour and then poured onto 200 g. of ice containing 50 g. ammonium chloride dissolved in 100 g. of water. To complete the hydrolysis, dilute sulfuric acid was added to a pH of 6–7. The aqueous layer was removed and the diethylether layer was washed with 200 ml. of 5% sodium bicarbonate solution. After drying with 20 g. of sodium sulfate, the diethylether was removed on a steam bath and the product fractionated at 2 mm. mercury.

Yield = 23.0 g. dibutylpropylcarbinol
= 51.4% of the theoretical yield

In a similar manner other compositions coming within the scope of the invention can be prepared from magnesium and various organic halides which are capable of reacting with magnesium to form Grignard reagents. Examples of such organic halides are ethyl bromide, propyl chloride, butyl chloride, butyl bromide, butyl iodide, pentyl chloride, hexyl chloride, octyl chloride, nonyl chloride, dodecyl chloride, dodecyl bromide, hexadecyl chloride, 3-phenyl propyl chloride, phenyl chloride, phenyl bromide, phenyl iodide, 4-chlorotoluene, 1-chloronaphthalene, and 1-bromonaphthalene. In some cases, as previously indicated, it may be desirable to prepare the Grignard reagent in a medium containing an ether such as diethylether, or tetrahydrofuran, or other oxygenated solvent, before dispersing said reagent in a hydrocarbon which is solid at room temperature. In other cases, a mixture of such oxygenated solvent and a liquid hydrocarbon can be used as a reaction medium in the preparation of the Grignard reagent. In still other cases, an exclusively liquid hydrocarbon medium can be used, such as, for example, heptane, pentane, Stoddard solvent, or mixtures of such substances. In other cases, the Grignard reagent can be prepared in mixtures of a hydrocarbon which is liquid at room temperature and a hydrocarbon which is solid at room temperature. The last named mixtures can also contain oxygenated solvents of the type previously mentioned. Where the Grignard reaction proceeds in a hydrocarbon medium the preferred procedure is to form the Grignard reagent in hydrocarbon media containing a hydrocarbon which is normally solid at room temperature but which is molten under the conditions of the reaction and to recover the desired product by cooling, preferably after removing any excess of the hydrocarbon media.

In the examples, the magnesium used was a special type of magnesium chips which do not form a part of the present invention. These magnesium chips are characterized by the fact that they are plastically deformed to an average thickness within the range of 0.0001 inch to 0.0075 inch by a mechanical cutting operation and have the chemical characteristic that when reacted with n-butyl chloride in proportions of 2.00 g. of magnesium chips to 7.62 g. of n-butyl chloride in a predominantly hydrocarbon medium consisting of 110—$x$ mls. of heptane and $x$ ml. of diethylether give conversions of Grignard reagents that when plotted graphically with percent conversion as the ordinate and the molar ratio of diethylether to n-butyl chloride as the abscissa show a minimum conversion where said molar ratio is between 1 and 2, which minimum is at least 60%. These special magnesium chips are especially suitable for the direct production of Grignard reagents in paraffin or other hydrocarbons which are solids at room temperature.

The Grignard reaction can be carried out with ordinary magnesium chips but much lower yields of the Grignard reagent are obtained. For example, when butylmagnesium chloride was made in paraffin according to the procedure set forth in Example IV using the same conditions except for the substitution of an identical quantity of conventional magnesium chips for the special magnesium chips, the yield was 59 g. instead of 101 g. The resultant wax coated butylmagnesium chloride was successfully used in making dibutylpropylcarbinol according to the following procedure:

EXAMPLE XXI

*Dibutylpropylcarbinol*

Wax coated butylmagnesium chloride (178 g.) containing 0.46 mole of butylmagnesium chloride, was dispersed in 500 ml. of heptane. To this was added 0.3 mole of ethylbutyrate (in 200 ml. of heptane) and the mixture was stirred for one hour at 150–200° F. After cooling to 100° F., 70 g. of ammonium chloride in 300 ml. of water was added followed by 30 g. of sulfuric acid in 200 ml. of water to bring the pH to 7. Ethyl acetate (200 ml.) was added to help retain the product in the heptane layer. The aqueous layer was removed and the heptane layer was washed with aqueous sodium bicarbonate. The combined water layers were counter-extracted with 100 ml. of ethyl acetate. The combined ethyl acetate-heptane layers were dried with sodium sulfate and the solvents removed by vacuum stripping. The product was fractionated at 4 mm. of mercury.

Yield = 31.8 g. of dibutylpropylcarbinol
= 74.6% of theoretical yield.

From the foregoing examples, it will be seen that the invention is especially useful in making a composition containing butylmagnesium chloride dispersed in a hydrocarbon medium which is solid at room temperature as, for example, a high melting point paraffin wax, tetramethylbenzene, eicosane, or naphthalene. The wax coated butylmagnesium chloride is readily reacted with ethyl butyrate in diethylether or in heptane to produce dibutylpropylcarbinol.

In a similar manner the invention has been found to be especially useful in the preparation of phenylmagnesium chloride dispersed in a hydrocarbon medium which is solid at room temperature. Wax coated phenylmagnesium chloride can be reacted directly with other reactants, such as benzophenone to give triphenylcarbinol.

In a like manner, the invention is applicable to the preparation of other Grignard reagents dispersed in a hydrocarbon medium which is solid at room temperature. These products are relatively stable and are relatively simple to handle, ship and store.

The use of hydrocarbons which are solids at room temperature to prepare the products of the invention has the further advantage that such hydrocarbons are relatively inexpensive and readily available. Moreover, for the purpose of the invention they require little or no purification whereas trace amounts of moisture, alcohol or carbonyl compounds in ethers will inhibit the Grignard synthesis and often make initiation impossible. Hence, to assure high yields in ethers it is necessary to purify them with metallic sodium or to subject them to careful fractionation. The Grignard product which is obtained in an ether solution requires exceptional precautions in handling, shipping and storage as contrasted with the products of the present invention.

It will be understood in the foregoing specification that the term "Grignard reagent" has its conventional meaning and that while Grignard reagents are sometimes given the formula RMgX, where R is the organic radical and X is a halogen atom, this formula does not necessarily describe the structure of a Grignard reagent. It merely sets forth the fact that the Grignard reagent contains an organic radical, magnesium and halogen. Thus a Grignard reagent made from butylchloride and magnesium would be termed butylmagnesium chloride and correspondingly the Grignard reagent made from phenyl chloride and magnesium would be formed phenylmagnesium chloride.

While the utility of the solid hydrocarbon coated Grignard reagents has been illustrated by giving specific examples of the preparation of dibutyl propylcarbinol and triphenylcarbinol, it will be understood that the general principles of the invention involving the use of solid hydrocarbon coated Grignard reagents in organic syntheses are applicable to organic syntheses in general where Grignard reagents are employed.

The invention is hereby claimed as follows:

1. A Grignard reagent dispersed in a hydrocarbon medium which is solid at room temperature.
2. Butylmagnesium chloride dispersed in a hydrocarbon medium which is solid at room temperature.
3. Phenylmagnesium chloride dispersed in a hydrocarbon medium which is solid at room temperature.
4. Butylmagnesium chloride dispersed in a paraffin wax which is solid at room temperature.
5. Phenylmagnesium chloride dispersed in a paraffin wax which is solid at room temperature.
6. Butylmagnesium chloride dispersed in tetramethyl benzene.
7. Butylmagnesium chloride dispersed in naphthalene.
8. Phenylmagnesium chloride dispersed in tetramethyl benzene.
9. Phenylmagnesium chloride dispersed in naphthalene.
10. A process of preparing a Grignard reagent in a solid form which comprises dispersing a Grignard reagent in a hydrocarbon which is solid at room temperature.
11. A process of preparing a Grignard reagent in a solid form which comprises forming a Grignard reagent by reacting magnesium and an organic halide in a hydrocarbon which is solid at room temperature.
12. A process of preparing a Grignard reagent in a solid form which comprises forming a Grignard reagent by reacting magnesium and an organic halide in a hydrocarbon which is solid at room temperature under the influence of heat sufficient to maintain said hydrocarbon in a molten state, removing any excess of said hydrocarbon, and cooling the resultant mixture to produce a solid product containing said Grignard reagent dispersed in said hydrocarbon.
13. A process as claimed in claim 12 in which said reaction is carried out in the presence of at least one auxiliary solvent from the group consisting of oxygenated solvents which are liquids at room temperature and hydrocarbons which are liquid at room temperature, and thereafter removing said auxiliary solvent from the resultant product.
14. In a process of carrying out an organic synthesis with a Grignard reagent, the step which comprises carrying out such synthesis with a Grignard reagent dispersed in a hydrocarbon which is solid at room temperature.
15. A process of preparing dibutylpropylcarbinol which comprises reacting a butyl Grignard reagent dispersed in a hydrocarbon which is solid at room temperature with a butyric acid ester.
16. A process of preparing dibutylpropylcarbinol which comprises reacting butylmagnesium chloride dispersed in paraffin wax which is solid at room temperature with ethyl butyrate.
17. A process of preparing triphenylcarbinol which comprises reacting a phenyl Grignard reagent dispersed in a hydrocarbon which is solid at room temperature with benzophenone.
18. A process of preparing a triphenylcarbinol which comprises reacting phenylmagnesium chloride dispersed in paraffin wax which is solid at room temperature with benzophenone.

References Cited in the file of this patent

UNITED STATES PATENTS 2,824,897    Wujciak et al. _____ Feb. 25, 1958
2,852,544    Nowlin et al. _____ Sept. 22, 1958

OTHER REFERENCES

"Grignard Reactions of Nonmetallic Substances," Kharasch and Reinmuth, pages 50 and 549 to 558, Prentice-Hall Inc., New York, 1954.